Dec. 21, 1943.                    M. W. KELLY                    2,337,246
                          EXTENSIBLE BICYCLE PEDAL
                             Filed Nov. 4, 1942
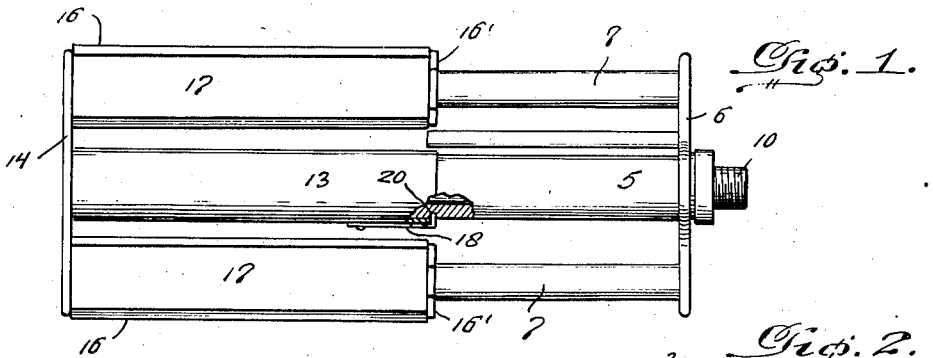
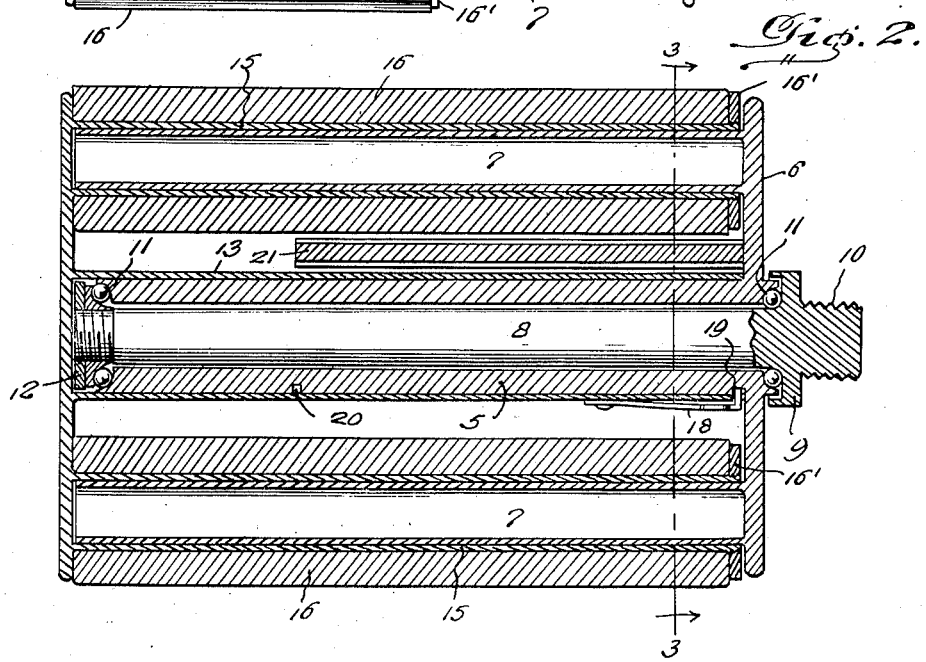
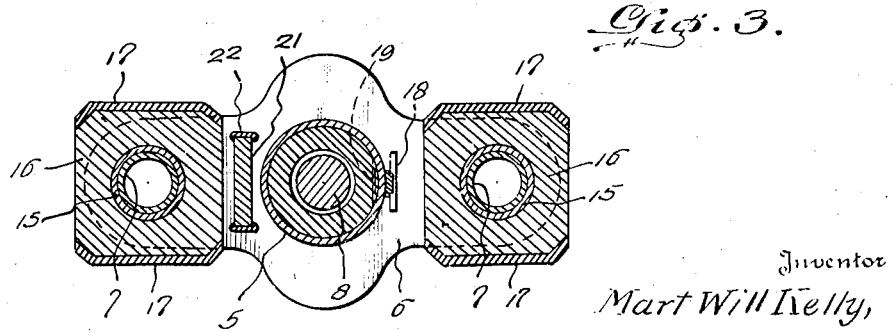
Inventor
Mart Will Kelly,
By Stanley Burch
           Attorney Patented Dec. 21, 1943

2,337,246

UNITED STATES PATENT OFFICE 2,337,246

EXTENSIBLE BICYCLE PEDAL

Mart Will Kelly, Bartlesville, Okla.

Application November 4, 1942, Serial No. 464,495

2 Claims. (Cl. 74—594.7)

This invention relates to a bicycle pedal which is so constructed that it can be adjusted to accommodate either one or two feet. In other words, by equipping each pedal hanger of a conventional bicycle having only two pedal hangers, with a pedal constructed in accordance with the present invention, the bicycle may be propelled by a single rider with the pedals in collapsed condition or by two riders with the pedals in extended position.

Heretofore, the conventional bicycle designed to carry only one person, has been equipped with pedals which permit only one rider to propel the bicycle. My idea is to provide an extensible pedal with which a conventional bicycle may be equipped, so that the bicycle can be ridden and propelled by two riders at the same time without the addition of further pedal hangers and pedals such as are provided in bicycles built for two riders and embodying a special frame with four pedals.

An object of my invention is to provide an extensible bicycle pedal which will make it possible for two persons to simultaneously propel a bicycle with a conventional frame and only two pedals. The second rider may stand up and propel the bicycle, or by the use of the dual seat disclosed in my copending application Serial No. 464,494, filed Nov. 4, 1942, both riders may be seated and enabled to propel the bicycle simultaneously.

Another object of the present invention is to provide an extensible bicycle pedal which will permit its use by either a single rider or two riders, and which can be installed on a conventional bicycle without material alterations of the latter and by mere substitution of the present pedal for each of those ordinarily provided on the conventional bicycle.

Still another object of the present invention is to provide an extensible bicycle pedal that can be used on a conventional bicycle pedal hanger, and which has foot pads of novel construction that can be made cheaply with an economical use of rubber.

With the above objects in view, and others that will become apparent as the nature of the invention is better understood, the present invention consists in the novel form, combination and arrangement of parts hereinafter more fully described, shown in the accompanying drawing and claimed.

In the drawing:

Figure 1 is a plan view, partly broken away and in section, of an extensible bicycle pedal constructed in accordance with the present invention.

Figure 2 is an enlarged central longitudinal sectional view thereof; and

Figure 3 is a transverse section taken on line 3—3 of Figure 2.

Referring in detail to the drawing, the present extensible bicycle pedal includes a main inner section composed of a hub 5 having a rigid or integral cross-piece 6 at its inner end and provided at or adjacent the ends of said cross-piece 6 with outwardly projecting rigid tubular arms 7 spaced from and parallel with the hub 5. The hub 5 is adapted to be journalled for free rotation upon the ordinary spindle 8 having a flange 9 adjacent its inner end and provided on said inner end inwardly of the flange 9 with threads as at 10 so that the spindle may be screwed into the conventional pedal hanger as is well known in the art. Suitable anti-friction bearings are provided between the spindle 8 and the ends of the hub 5 as at 11, the outer bearing 11 being adjustable and including an adjusting nut 12 as and for a well known purpose.

The present pedal further includes an adjustable outer section consisting of a sleeve 13 snugly slidably fitted on the hub 5 and provided at its outer end with a cross-piece 14 having inwardly projecting sleeves 15 rigid therewith and snugly slidably fitting over the tubular arms 7 of the inner section. Frictionally fitted on the sleeves 15 are tread blocks 16 which may be positively secured in place upon the tubes 15 by means of nuts 16 threaded on the inner ends of said sleeves 15 against the inner ends of the tread blocks 16. The upper and lower faces of the tread blocks 16, which are adapted to be contacted by the rider's foot, may be faced with suitable rubber tread strips 17 cemented in place. By thus providing blocks 16 of wood or the like and facing them with tread strips 17, economical and cheap use of rubber is provided for. It will thus be seen that the outer pedal section may be slid inwardly to the position of Figure 2 so as to provide a pedal of single length adapted for use by a single rider, or the outer pedal section may be extended or slid outwardly to the position of Figure 1 to provide a pedal of several lengths which may be simultaneously engaged and acted upon by two feet or by one foot of each of two riders, whereby the two riders may simultaneously propel the bicycle. Suitable means is provided for releasably retaining the outer pedal section in either of its adjusted positions. As shown, such means may consist of a spring catch 18 carried by the inner end of the sleeves 13 and having an inwardly directed free end arranged to engage in a recess 19 of the hub 5 when the outer pedal section is in its inwardly adjusted position, to retain the pedal in condition for use by a single rider, or to engage in a further recess 20 of the hub 5 when the outer pedal section is in its outwardly adjusted position with the pedal conditioned for use by two riders.

In order to provide for anti-slipping engagement of a rider's foot with the inner portion of the pedal when the latter is in extended condition, the cross-piece 6 of the inner pedal section may be provided at one or both sides of the hub 5 with outwardly projecting bars 21 parallel with and between the hub 5 and arms 7, the upper and lower edges of said bar or bars being faced with rubber tread members 22 that may be cemented or otherwise secured upon said edges of bar or bars 21.

In use, assuming that the pedal is in collapsed condition as shown in Figure 2, it may be readily extended to the condition of Figure 1 by releasing the catch 18 and sliding the outer section outwardly until the catch engages in the outer recess 20 as shown in said Figure 1. Conversely, the pedal may be collapsed from the condition of Figure 1, to the condition of Figure 2 by simply disengaging the catch 18 from recess 20 and sliding the outer pedal section inwardly until the catch 18 engages in the inner recess 19. Thus, a simple and durable construction of pedal is provided which may be readily and quickly adjusted to accommodate either one or two feet, for the purposes mentioned above. Minor changes in the details of construction illustrated and described, are contemplated, such as fairly fall within the spirit and scope of the invention as claimed.

What I claim as new is:

1. An extensible bicycle pedal comprising an inner section and an outer section, said inner section comprising a hub adapted to be journalled upon a conventional pedal hanger spindle and provided at its inner end with a cross-piece having rigid outwardly projecting arms adjacent the ends thereof located parallel with said hub, the outer section comprising a cross-piece having a sleeve slidably fitted on the hub of the inner section and provided near its ends with rigid inwardly projecting sleeves slidably fitted on the arms of the inner section, tread blocks fitted and secured on the sleeves of said outer section, and means to releasably retain the outer section in outwardly or inwardly adjusted position with respect to the inner pedal section.

2. An extensible bicycle pedal comprising an inner section and an outer section, said inner section comprising a hub adapted to be journalled upon a conventional pedal hanger spindle and provided at its inner end with a cross-piece having rigid outwardly projecting arms adjacent the ends thereof located parallel with said hub, the outer section comprising a cross-piece having a sleeve slidably fitted on the hub of the inner section and provided near its ends with rigid inwardly projecting sleeves slidably fitted on the arms of the inner section, tread blocks fitted and secured on the sleeves of said outer section, and means to releasably retain the outer section in outwardly or inwardly adjusted position with respect to the inner pedal section, and a supplemental tread member carried by the inner pedal section and including a bar fixed to the cross piece of said inner section and projecting outwardly therefrom parallel with and between the hub of said inner section and one of its outwardly projecting arms, and tread strips secured on the upper and lower edges of said bar.

MART WILL KELLY.